US008266891B2

United States Patent
Soliman et al.

(10) Patent No.: US 8,266,891 B2
(45) Date of Patent: Sep. 18, 2012

(54) METHOD AND SYSTEM FOR EMISSION CONTROL OF A COMPRESSION IGNITION LOCOMOTIVE ENGINE

(75) Inventors: Samar Shaker Soliman, Marietta, GA (US); Roy James Primus, Niskayuna, NY (US); Bhaskar Tamma, Bangalore (IN); Jonathan Lloyd Male, Schoharie, NY (US); Anthony Holes Furman, Scotia, NY (US); Juan Carlos Alvarez, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 2173 days.

(21) Appl. No.: 10/983,287

(22) Filed: Nov. 8, 2004

(65) Prior Publication Data

US 2006/0096273 A1 May 11, 2006

(51) Int. Cl.
*F01N 3/00* (2006.01)
(52) U.S. Cl. .............. 60/285; 60/274; 60/299
(58) Field of Classification Search ........... 60/274, 60/276, 285, 299
See application file for complete search history.

(56) References Cited

U.S. PATENT DOCUMENTS

| 5,113,173 | A  | * | 5/1992  | Lawson ............ 340/449 |
| 5,878,567 | A  |   | 3/1999  | Adamczyk et al. |
| 6,382,177 | B1 | * | 5/2002  | Saito ............ 123/299 |
| 6,658,845 | B1 |   | 12/2003 | Sun et al. |
| 6,912,992 | B2 | * | 7/2005  | Ancimer et al. ....... 123/299 |

FOREIGN PATENT DOCUMENTS

| EP | 0786284 | 7/1997 |
| EP | 0849441 | 6/1998 |
| EP | 0937885 | 10/1999 |

* cited by examiner

*Primary Examiner* — Thomas Denion
*Assistant Examiner* — Diem Tran
(74) *Attorney, Agent, or Firm* — Richard A. DeCristofaro (57) ABSTRACT

Method and system for emission control of a compression ignition locomotive engine. The method includes measuring an actual power level of the engine, comparing a desired power level with the actual power level of the engine; implementing a combustion strategy based on the comparing of the desired and the actual power levels; and implementing an emission strategy based on the combustion strategy. The emission strategy is intended to attain a predetermined emission level in the exhaust from the engine.

22 Claims, 9 Drawing Sheets

| Example of Two Stroke EFI Locomotive Engine: Strategy for Combustion |||
|---|---|---|
| Notch | Strategy (pilot) | Strategy (main) |
| 8 | - | 8° timing retard |
| 7 | - | 8° timing retard |
| 6 | 60% HCCI | 40% Main |
| 5 | 80% HCCI | 30% Main |
| 4 | 100% HCCI | - |
| 3 | 100% HCCI | - |
| 2 | 100% HCCI | - |
| 1 | 100% HCCI | - |

*Fig. 4*

| Example of Two Stroke EFI Locomotive Engine: Emission Level |||
|---|---|---|
| Notch | Original Tier-0 NOx (g/hp/hr) | Estimated NOx (g/hp/hr) |
| 8 | 9.11 | 6.00 |
| 7 | 8.15 | 6.68 |
| 6 | 8.56 | 3.42 |
| 5 | 8.3 | 1.66 |
| 4 | 8.84 | 0.88 |
| 3 | 9.17 | 0.92 |
| 2 | 10.59 | 1.06 |
| 1 | 21.61 | 2.16 |

| Example of Four Stroke EFI Locomotive Engine: Strategy for Combustion | | |
|---|---|---|
| Notch | Strategy (pilot) | Strategy (main) |
| 8 | - | Retard to Tier 1 Level |
| 7 | - | Retard to Tier 1 Level |
| 6 | 60% HCCI | 40% Main |
| 5 | 80% HCCI | 30% Main |
| 4 | 100% HCCI | - |
| 3 | 100% HCCI | - |
| 2 | 100% HCCI | - |
| 1 | As is | - |

*Fig. 10*

| Example of Four Stroke EFI Locomotive Engine: Emission Level | | |
|---|---|---|
| Notch | Original Tier-0 NOx (g/hp/hr) | Estimated NOx (g/hp/hr) |
| 8 | 6.49 | 5.79 |
| 7 | 6.39 | 5.75 |
| 6 | 6.74 | 2.70 |
| 5 | 6.84 | 1.37 |
| 4 | 12.35 | 1.24 |
| 3 | 14.61 | 1.46 |
| 2 | 11.30 | 1.13 |
| 1 | 13.27 | 13.27 |

METHOD AND SYSTEM FOR EMISSION CONTROL OF A COMPRESSION IGNITION LOCOMOTIVE ENGINE

BACKGROUND

This invention relates generally to emission control strategies for compression ignition engines and, more particularly, to a combustion strategy that controls emissions generated by compression ignition diesel engines.

Diesel engine exhaust is a heterogeneous mixture that contains gaseous emissions such as carbon monoxide (CO), carbon dioxide ($CO_2$), unburned hydrocarbons (HC) and nitrogen oxides ($NO_x$). Additionally, diesel engine exhaust contains particulate matter (PM). Soot is a solid, dry, carbonaceous material and is one component in total particulate matter (TPM). Soot contributes to visible emissions in diesel exhaust. As diesel engines operate with an excess of combustion air (lean exhaust), such engines generally have emissions of CO and gas phase HCs that are below the limits set by the Environmental Protection Agency (EPA). In recent year, however, emissions from diesel engines have been under increased scrutiny and standards, especially for particulate emissions, have become stricter.

There is increasing pressure on the railroads to reduce the emissions of the current fleet. In response, several railroads have agreed to significantly improve emission levels of current locomotives to achieve a fleet average of U.S. EPA Tier II level by 2010. At present, over 85% of the North American railroad fleet was built prior to the year 2000. These locomotives have not yet reached the end of their useful life but must eventually meet the US EPA Tier 0 standards and potentially even lower emissions levels. For locomotives operating in California, $NO_x$ emissions levels must be reduced to meet the Tier II EPA requirements discussed above. The railroad companies that own these older locomotives stand to incur a heavy loss by retiring them prematurely or paying fines unless the locomotives can be modified to meet lower emissions levels. Accordingly, there is a need in the art to provide a more effective method and system for emission control of diesel engines without requiring much change in their engineering design.

BRIEF DESCRIPTION

Briefly, in accordance with one embodiment of the invention, a method is provided for controlling an emission level of a compression ignition engine equipped with an electronic fuel injection system. The method includes measuring an actual power level of the engine, comparing a desired power level with the actual power level of the engine; implementing a combustion strategy based on the comparison of desired and actual power levels; and implementing an emission strategy based on the combustion strategy. The emission strategy is intended to attain a predetermined emission level in the exhaust from the engine.

In accordance with another embodiment of the invention, a system is provided to control an emission level of a compression ignition engine equipped with an electronic fuel injection system. The system includes an engine controller coupled with the engine and configured to measure an actual power level of the engine, compare a desired power level of the engine with the actual power level of the engine and select a combustion strategy based on relative magnitudes of the desired power level and the actual power level.

These and other features, aspects, and advantages of the present invention will become better understood when the following detailed description is read with reference to the accompanying drawings in which like characters represent like parts throughout the drawings.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The basic combustion process for diesel engines involves diffusion-type combustion resulting from the direct injection of liquid fuel into a high temperature gas environment. More specifically, as liquid fuel is injected into compressed hot cylinder air, the fuel atomizes, evaporates and mixes with the surrounding air to form a flammable mixture. This is a continuing process that happens over time as the fuel is injected into the cylinder and this mixing-control combustion event continues beyond the end of liquid fuel injection. The diffusion flame combustion raises the local gas temperature high enough to initiate the formation of $NO_x$ from the nitrogen and oxygen in the air. $NO_x$ formation is a strong function of temperature and increasing the local gas temperature increases NO$_x$ formation. Another aspect of emissions from the basic diesel combustion event is soot formation and oxidation. With the heterogeneous nature of diffusion flame combustion, the local mixture in the combustion chamber ranges from all fuel to all air. In the fuel rich regions, soot can form since there is an inadequate supply of oxygen to react with the carbon. Once formed the soot must come into contact with enough oxygen at a sufficiently high temperature to complete the oxidation process. If this does not occur before the power stroke volume expansion sufficiently lowers the cylinder temperature, the chemical reaction is stopped, and any non-combusted soot remaining in the cylinder is discharged from the engine as smoke or particulate emission when the exhaust valve is opened.

The technical details of compression ignition diesel engines and the associated combustion process are known to persons skilled in the art and specifics are not disclosed herein. The different embodiments and modes of emission control contemplated for the compression ignition diesel engines of the present invention are herein described. It should be understood that the best mode for carrying out the invention hereinafter described is offered by way of illustration and not by the way of limitation. It is intended that the scope of the invention include all modifications that incorporate its principal design features.

While the present invention is described in the context of a locomotive, it is recognized that the benefits of the invention accrue to other applications of diesel engines, such as diesel generators, mixed fuel reciprocating engines and off-and-on highway diesel engines. Therefore, this embodiment of the invention is intended solely for illustrative and exemplary purposes and is in no way intended to limit the scope of application of the invention.

Figure 1:
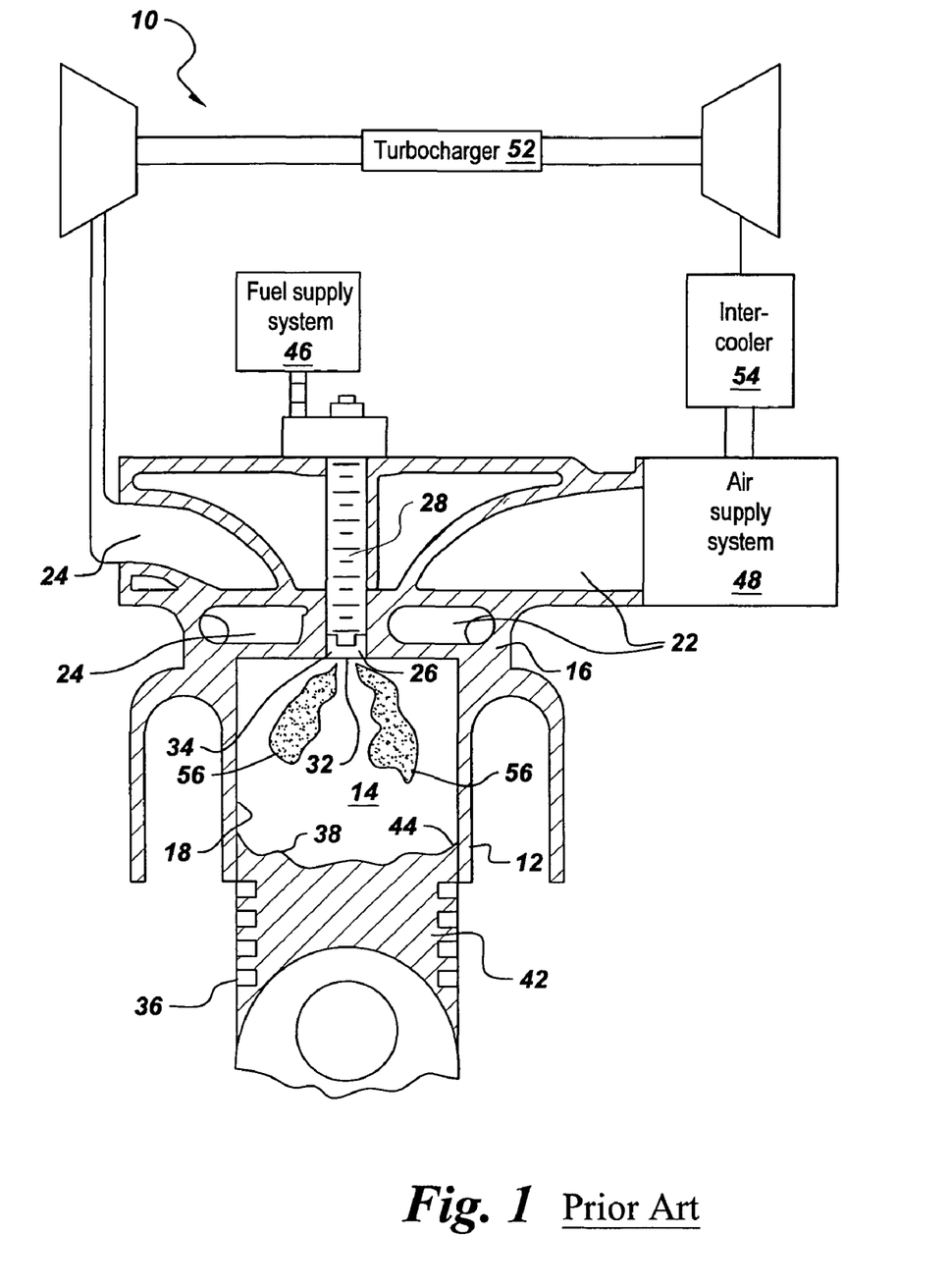
FIG. 1 is a simplified cross-sectional view of a traditional four-stroke direct injection compression ignition engine system as found in prior art.

FIG. 1 is a cross sectional view of a portion of a four-stroke cycle, medium speed diesel engine 10 with in-cylinder mixing as found in prior art for traditional direct injection systems used in locomotives. The engine 10 includes an engine block 12 that defines a cylinder 14 including a cylinder head 16 and a circumferential wall surface or liner 18. An air intake manifold 22 and an exhaust gas manifold 24 communicate through cylinder head 16 with cylinder 14. Air intake manifold 22 is in flow communication with cylinder 14 through an intake port and valve arrangement (not shown) and exhaust gas manifold 24 is in flow communication with cylinder 14 through an exhaust port and valve arrangement (not shown). The cylinder 14 includes at least one fuel injection port 26 communicating with a fuel injector 28 including an injector nozzle 32. Fuel injector 28 is in communication with a fuel supply system 46. Air intake manifold 22 is in communication with an air supply system 48. The engine 10 also typically includes a turbocharger 52 and an intercooler 54 connected between the compressor outlet of the turbocharger 52 and the air supply system 48. The intercooler 54 facilitates cooling of the turbo-charged air before it enters a respective power cylinder 14.

A piston 42 is slidingly disposed in cylinder 14 and includes a face 38 that is adjacent to the cylinder head 16, and a circumferential sidewall surface 44 that is spaced from cylinder 14 by a predetermined clearance gap (not shown). Piston 42 includes a plurality of closely spaced, annular grooves, each of which is configured to receive an annular, split, pack of rings 36 for establishing a compression seal between piston sidewall surface 44 and cylinder liner 18. Piston 42 is shown in a bottom-dead-center (BDC) stroke position, in which piston face 38 and cylinder head 16 are at their furthest relative distance. Piston 42 reciprocates inside cylinder 14 between BDC and a top-dead-center (TDC) stroke position in which piston face 38 and cylinder head 16 are at their closest relative distance. Thus, cylinder 14 has a maximum working volume above piston face 38 when piston 42 is at BDC, and a minimum working volume above piston face 38 when piston 42 is at TDC. The ratio of the BDC volume to the TDC volume is known as the compression ratio of cylinder 14.

In operation, piston 42 reciprocates between TDC and BDC positions. More specifically, the movement of piston 42 from TDC to BDC is referred to as a down-stroke and the movement of piston 42 from BDC to TDC is referred to as an upstroke. One complete revolution of the crank is required for a complete cycle of a two-stroke engine and two complete revolutions of the crank are required for a complete cycle of a four-stroke engine. For the operation of a four-stroke engine, starting from a position wherein piston 42 is at TDC, during or after a firing of fuel in cylinder 14 from a previous cycle, a first down-stroke or power stroke occurs after combustion when piston 42 is driven away from cylinder head 16 by a force of rapidly expanding combustion gases. The force acting on piston 42 is transmitted to connecting parts (not shown) to deliver mechanical energy to drive an engine shaft (not shown). For reference, a piston position at TDC during firing is known as a crank angle of zero degrees.

As piston 42 reaches BDC, or a crank angle of one hundred eighty degrees, the next stroke of the cycle begins. A first upstroke or exhaust stroke expels depleted combustion gases from cylinder 14. As piston 42 moves toward cylinder head 16, the volume of cylinder 14 decreases, causing the exhaust gas pressure in cylinder 14 to increase. During the exhaust stroke, the exhaust valve is open to allow the increasingly pressurized exhaust gas to escape cylinder 14. After piston 42 reaches TDC, or a crank angle of three hundred sixty degrees, the third stroke, a second down stroke or, intake stroke occurs, and the air inlet valve is open and combustion air fills the cylinder 14.

At BDC, piston 42 reverses travel and begins a compression stroke and the air inlet valve is closed. During the compression stroke, as piston 42 moves closer to cylinder head 16, the volume of cylinder 14 decreases, causing the temperature and pressure of the combustion air to increase. For a typical direct injection engine, the injector 28 releases a quantity of pressurized fuel, the main charge of fuel, through nozzle 32 into cylinder 14. As the fuel is injected it is atomized, vaporized, mixed with the high temperature air and releases the chemical energy of the fuel thereby further increasing the pressure and temperature of the cylinder gas to lead into the power stroke.

The traditional direct-injection system referred to above generates higher levels of emissions due to the dominance of diffusion flame combustion mode. The dual mode combustion strategy of one embodiment of the present invention allows an engine to operate in a different combustion mode compared to a traditional single injection engine as found in a railroad locomotive. The dual mode combustion strategy is based on power levels of an engine as explained in more detail below.

Figure 2:
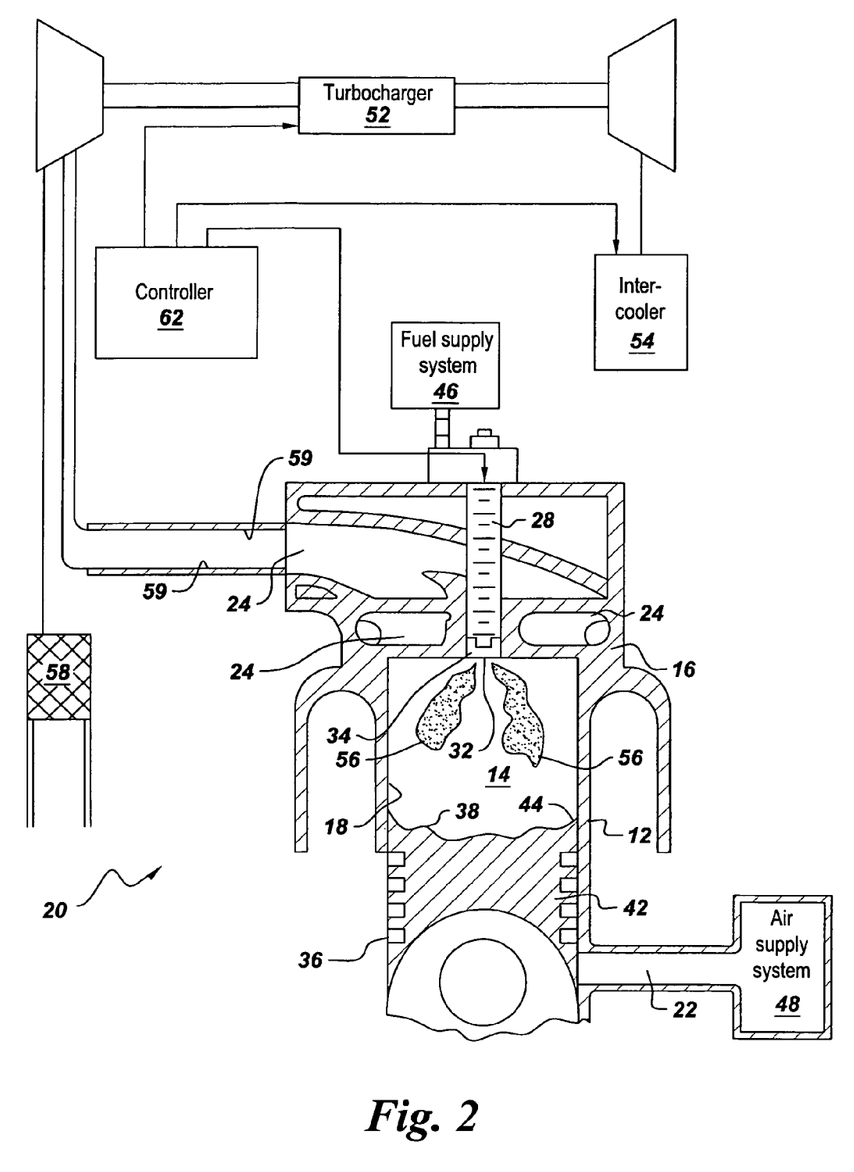
FIG. 2 is a simplified cross-sectional view of a two-stroke direct injection compression ignition engine system in accordance with an exemplary embodiment of the invention.

FIG. 2 is a simplified cross-sectional view of a two-stroke direct injection compression ignition engine system 20 in accordance with an exemplary embodiment of the invention. The engine 20 is enhanced by the addition of an engine controller 62. Other than the engine controller 62, the components of engine 20 are substantially similar to engine 10 shown in FIG. 1. Components in engine 20 that are identical to components of engine 10 are identified in FIG. 2 using the same reference numerals used in FIG. 1.

Figure 3:
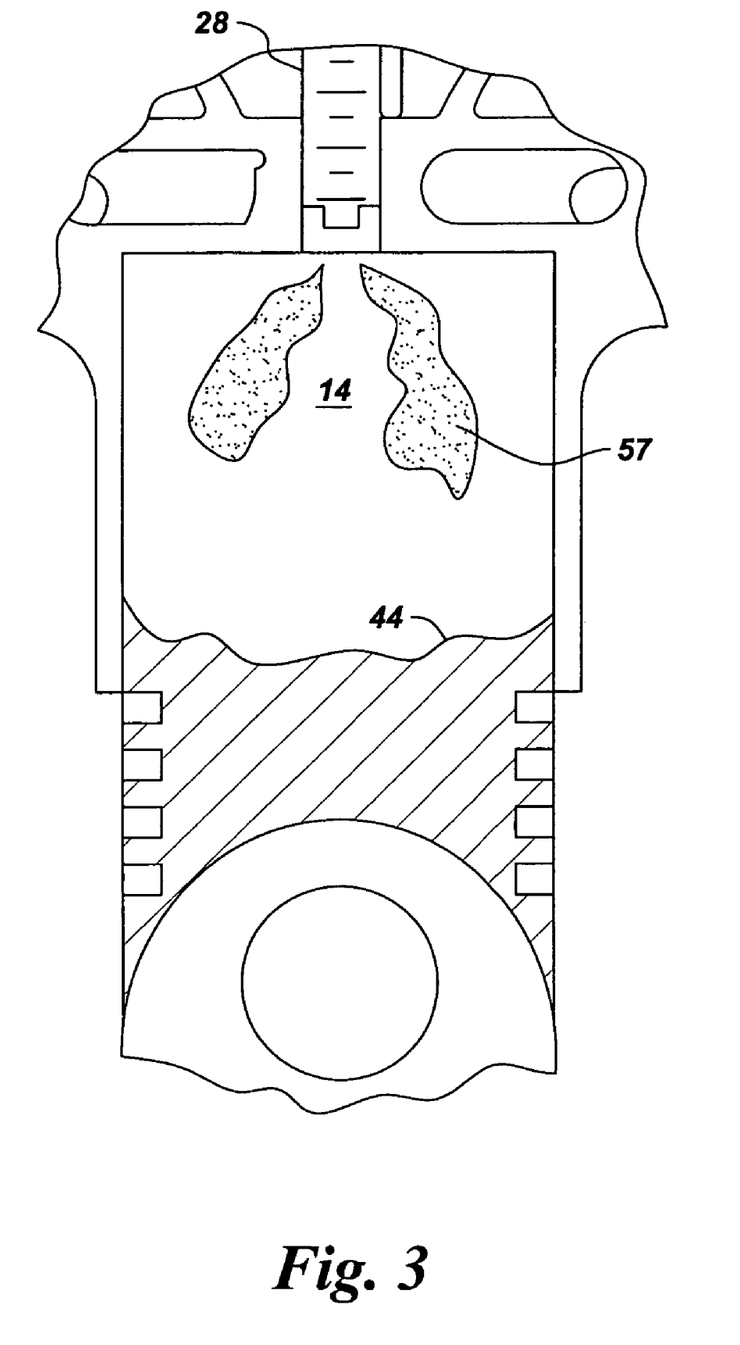
FIG. 3 is a simplified cross-sectional view of the combustion cylinder of a two-stroke direct injection compression ignition engine system at an instant of injection of a main charge in accordance with an exemplary embodiment of the invention.

In operation, for the dual-mode combustion strategy as embodied in this invention, during the compression stroke, injector 28 releases a first, pilot charge 56 of fuel through nozzle 32 into cylinder 14 at a crank angle of between approximately negative one hundred and eighty degrees and approximately zero degrees for a four-stroke engine and approximately negative ninety degrees and approximately twenty degrees for a two-stroke engine. Pilot charge 56 contains all or a portion of the fuel that will be injected during that cycle. Nozzle 32 is configured to atomize the fuel passing through it. The warmed and atomized fuel vaporizes in cylinder 14 and mixes with the combustion air in cylinder 14. During the compression stroke, as piston 42 moves closer to cylinder head 16, the volume of cylinder 14 decreases, causing the temperature and pressure of the combustion air and fuel mixture to increase. When the combustion air and fuel mixture reaches an optimum predetermined temperature and pressure typically suitable for good combustion, the injector 28 releases a second quantity of pressurized fuel or a main charge. FIG. 3 is a simplified cross-sectional view of the combustion cylinder 14 of the engine 20 and it illustrates an instant of injection of the main charge 57 through nozzle 32 into cylinder 14.

In accordance with the dual-mode combustion strategy of the engine 20 illustrated in FIG. 2, first, a pilot charge 56 is released at a crank angle between approximately negative ninety degrees and approximately twenty degrees for the two-stroke engine. The second quantity of fuel, the main charge 57, contains the remaining fuel that will be injected during that stroke. Combustion takes place near TDC and is controlled to occur at an optimum point in the stroke. Regulating the temperature of the combustion air, the timing and duration of injection of the pilot charge 56 and the timing and duration of injection of the main charge 57 controls the combustion process.

With a dual mode combustion strategy, a portion of, or all of, the fuel is injected early in the engine cycle, such as during the intake stroke or up to the very beginning stage of the compression stroke. This allows enough time for the fuel and the in-cylinder gas to mix before ignition. The combustion air and fuel are mixed in this process and this mixture either auto-ignites during the compression process or is ignited by injecting a portion of the fuel near TDC. This combustion mode is referred to as Homogeneous Charge Compression Ignition (HCCI). The main injection will trigger combustion of the pilot charge 56 and air if the pilot charge-air mixture has not auto-ignited prior to the main injection event. In the engine 10, injection of fuel early in the engine cycle is achieved by an electronic fuel injection system. Such an electronic fuel injection system is programmable to control the timing and quantity of the pilot charge 56 and the main charge 57. Referring to FIG. 2 momentarily, the engine controller 62 controls and monitors the timing and quantity of the pilot charge 56 and the main charge 57.

The engine controller 62 typically comprises a proportional-integral-differential (PID) controller or other set-point controller capable of comparing numerical values and selecting steps. The operation of the engine controller 62 is software based and the software routines within its microprocessor(s) enable the engine controller 62 to provide command signals to the fuel injector 28 to control the amount of fuel injected into the combustion cylinder 14 of the engine 20. In another engine configuration, software routines of the engine controller 62 enable the engine controller 62 to send command signals to the turbocharger 52 to control the amount of air entering into the combustion cylinder 14 of the engine 20.

Functionally, the engine controller 62 ensures that by controlling the amount of fuel or air injected into the combustion cylinder 14, incomplete combustion in the engine 20 is minimized. This is so because incomplete combustion in an engine is typically associated with high emission level. One way of reducing the emission level of the engine 20 is to prevent the problem at its source, or to prevent incomplete combustion during any particular cycle of the engine 20. Several methods exist for reducing the emission level of an engine at the source, but they have problems such as lack of proper monitoring and control methods and systems. In the instant invention, however, a dynamic control method and system is implemented in the engine controller 62 as described below and this results in emissions levels that will meet or exceed the Tier II emissions requirements of the US EPA.

The engine controller 62 implements the dynamic control method for controlling the emission levels at different desired power levels of an engine by varying the combustion strategies with the desired power levels. At a given power level, a suitable combustion strategy is selected for the engine and some or all of the fuel, depending on notch setting, is burnt in a fully or partially premixed mode, to achieve low emissions. The primary objective of such a combustion strategy is to attain a predetermined emission level at each power level. The dynamic control method renders the combustion strategy flexible, precise and effective at different power levels. According to one embodiment of the invention, the fuel and air are mixed to a desired composition such that the entire mixture is at an overall lean equivalence ratio. According to another embodiment of the invention, the fuel and air are mixed in a predetermined stratification. This process facilitates eliminating the formation of soot and it also results in low $NO_x$ emissions due to low flame temperatures. Moreover, ignition occurs substantially spontaneously and concurrently at many points in cylinder 14 because there is no locally rich zone of combustion.

In operation, software routines stored in the engine controller 62 capture the functional relationship between desired power levels and suitable combustion strategies corresponding to each of the power levels. It should be appreciated that such combustion strategies are implemented to ensure appropriate conditions for complete combustion of engine fuel.

As an objective of the dynamic control method and system, it is desirable to control the quantity of the pilot charge 56 or of the main charge 57 of the engine 20 in an attempt to prevent the engine emission level from increasing beyond the target value. In accordance with this technique, at one point of operation when the engine 20 is typically used to power a low-notch load, a suitable combustion strategy is employed as is described below and the emission level in the exhaust from the engine 20 is maintained below an acceptable limit. In a like fashion, at another point of operation such as during deceleration of the engine at a higher power level or at a dynamic braking power level or at a low idling power level, a different combustion strategy is employed to prevent the rise of emission levels at those instants. Details of this method of dynamic control by varying the combustion strategy depending on different desired power levels of the engine is illustrated with examples in more details below.

Continuing to refer to FIG. 2, the engine controller 62 of the two-stroke engine 20 has an input that provides a signal synchronous with the power levels of the engine and a sequencing circuit responsive to the signal. The signal senses the change in desired power level as compared to the actual power level and directs the combustion strategy accordingly by means of controlling the fuel injection and thereby controlling the flow of the pilot charge 56 and the main charge 57 into the cylinder 14 at appropriate times. Other inputs to the engine controller 62 include ambient conditions, intake manifold conditions and other engine operating parameters.

On the output side, the engine controller 62 has an output that controls the quantity or timing of the pilot charge 56. In addition, the engine controller 62 has another output that controls the quantity or timing of the main charge 57. The sequencing circuit periodically alternates between the two outputs related to the pilot charge 56 and the main charge 57 in synchronization with the operation of the engine.

The combustion strategy adopted in this embodiment of the invention reduces the emission of $NO_x$. However, one of the strategies of $NO_x$ reduction—retarding injection timing of fuel, causes a corresponding increase in particulate emissions, particularly of the dry carbon or soot portion. Accordingly, other strategies are employed to reduce the emissions of non-$NO_x$ gases.

One such particulate emission reduction strategy is to reduce the level of the emission of HC compounds in the exhaust from the engine by applying a coating of different oxidation catalysts 59 on the inner side of the exhaust manifold 24 or a structure within the exhaust manifold 24. The coating of oxidation catalysts 59 includes precious metals, non-precious metals and their oxides. Referring to a standard Periodic Table (not shown), such metallic oxides include Group VB oxides such as Vanadium oxides, Group VIB oxides such as Chromium and Molybdenum oxides, Group VIIB oxides such as Manganese oxides, Group VIII oxides such as Iron oxides, or Group I-B oxides such as Copper oxides or Group II-B oxides such as Zinc oxides. Furthermore, Group III-A oxides such as Indium oxides may be used either alone or dispersed on a high surface area support such as Alumina, Zirconia, Silicon Carbide or Titania. The oxides may be utilized as singular active species or combinations of binary-quaternary mixtures. An alternate strategy would be to coat the oxidation catalysts on to a large opening substrate such as a monolith or foam that was subsequently inserted into exhaust manifold 24 with minimal pressure drop. The oxidation catalysts 59 oxidize the HC compounds present in the exhaust of the engine 20 and thereby reduce the emission level of these compounds effectively. Used in combination with the $NO_x$ reduction strategy, this system thus reduces emission of HC compounds.

Another way to reduce the emission level, specifically of particulate matters is to minimize incomplete combustion of any left over lubricating oil in the combustion cylinder 14. Moreover, the oxidation catalysts 59 are periodically treated at high temperature by either electrical heating or manipulation of the engine operation to produce high exhaust gas temperatures to remove the sulfates that are deposited on their surfaces from continuous operation. This is known as regeneration of the oxidation catalysts. Reduction in the exposure to high sulfur lubricating oil in turn reduces the frequency of regenerations necessary for the oxidation catalysts 59. Minimizing incomplete combustion of left over lubricating oil in the combustion cylinder 14 is accomplished by providing a ring pack designed for use in the combustion cylinder 14. In particular, the pack of rings 36 of the engine 20 in FIG. 2 is designed in such a way that the consumption of a lubricating oil used in the combustion cylinder of the engine is much less as compared to traditional direct injection compression ignition diesel engines.

In accordance with one embodiment of this invention, yet another strategy to reduce emission level is to reduce the level of the particulate matters by employing a filter trap in the exhaust system. Referring to FIG. 2, a filter trap 58 is used to further reduce the emission from the exhaust manifold 24 of the engine 20. Removal of spent combustion products from the combustion cylinder 14 is provided for by the exhaust manifold 24. The filter trap 58 is configured to trap particulate materials present in an exhaust from the engine 20. The filtration material used in the particulate trap portion of the exhaust manifold 24 is of any type capable of collecting a substantial volume of particulates. Various materials for this purpose are available, examples of which are compacted high temperature wire-mesh, fibrous ceramic materials and monolithic ceramic filter structures that may be coated with a catalytic agent.

One problem associated with the use of a filter trap is that a substantial volume of sooty, largely carbonaceous particulates is collected within the filter trap 58 as the engine continues in its operation. In order to prevent the mass of material from becoming great enough to excessively restrict gas flow through the exhaust system, the collected particulates are incinerated at desired intervals. The temperature of the collected particulates is increased to their incineration temperature. Once the incineration temperature is reached, the excess air normally present in diesel engine exhaust gases supports complete combustion of the collected particulates. Alternatively, the thermal output from any catalytic coating upon the combustion of particulate material on the front of the filter (soot cake) may be controlled and utilized by manipulating the temperature and oxygen level. The objective is to reduce particulate build up to leave a filtration layer of soot and not to influence pressure drop across the filter.

Various means have been proposed for igniting particulates collected in a trap at periodic intervals in order to obtain their incineration at desired intervals. Examples of such means include fuel burners incorporated in or ahead of the particulate trap, electric heating devices and throttling of the engine intake to increase the exhaust gas temperature. In general, such arrangements have required one or more additional heating units or relatively complex control systems to be added to the engine system.

Figure 4:
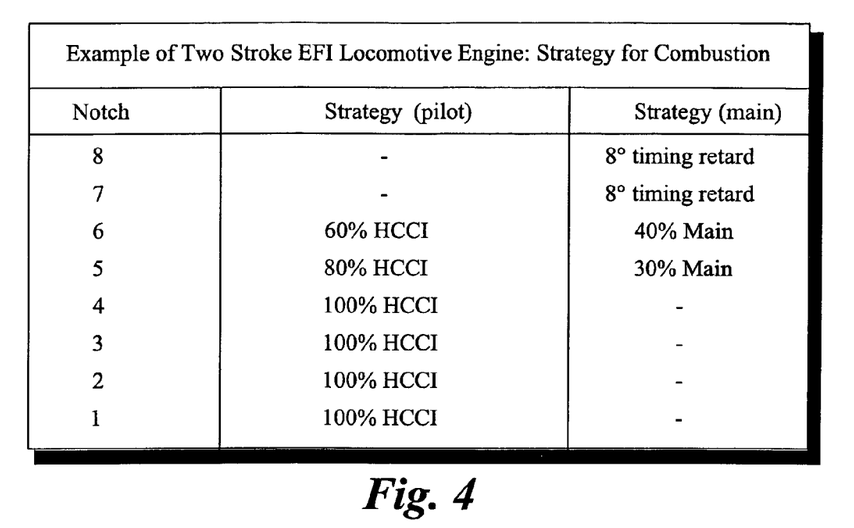
FIG. 4 is a combustion strategy of a two-stroke compression ignition engine in accordance with an exemplary embodiment of the invention.
Figure 5:
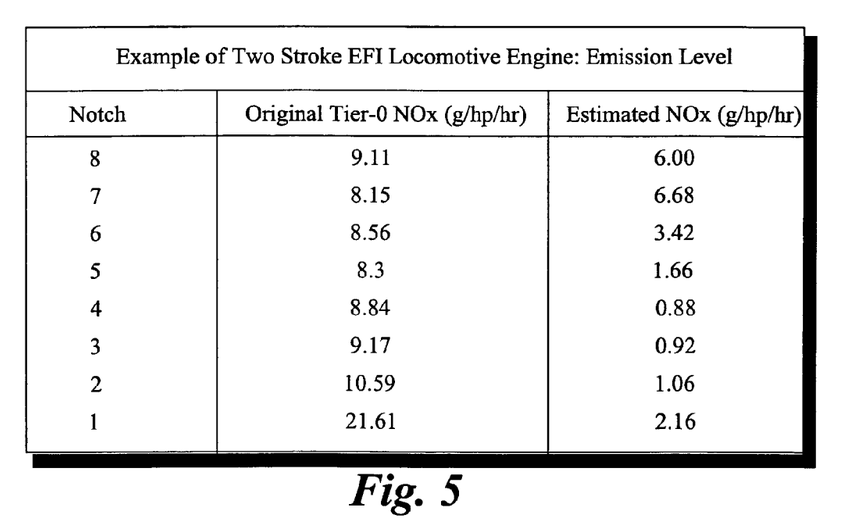
FIG. 5 is an emission level of a two-stroke compression ignition engine in accordance with an exemplary embodiment of the invention.

With reference to FIGS. 4-5, one embodiment of the present invention provides an efficient method for monitoring the combustion strategy and emission level resulting from the combustion based on the power levels of the engine 20 by means of the control of an electronic fuel injection system. In FIG. 3, numerical values are shown in the column 'NOTCH' for the typical eight power levels of an eight-level engine 20. Each numerical value in the column 'NOTCH' is associated with a specific notch or power level of the engine. The preferred combustion strategy of the engine is selected on a notch-by-notch basis to achieve the desired emission level. The emission level of a given notch is established by a suitable combination of the quantity of the pilot charge 56, quantity of the main charge 57 and injection timing of both the pilot charge 56 and the main charge 57. Expected emission levels follow from the selected combustion strategy as detailed below.

With continued reference to FIG. 3, a homogeneous mixture is formed by an early injection at low notches (up to notch 6). On the other hand, injection timing is typically retarded at higher notches such as notch 7 and 8. Injection timing for the pilot 56 charge is varied between 120 crank angle degree (CAD) before TDC (BTDC) stroke position and 20 CAD BTDC for a two-stroke engine. In a like fashion, the injection timing for the main charge 57 is varied between 10 CAD BTDC to 10 CAD After TDC (ATDC) up to notch 6. In summary, a representative example of the combustion strategy as illustrated in FIG. 3 includes "8 degrees timing retard" at notch 8, "8 degrees timing retard" at notch 7, 60% HCCI pilot charge 56 and 40% main charge 57 at notch 6; 80% HCCI pilot charge 56 and 20% main charge 57 at notch 5; 100% HCCI pilot charge 56 and no main charge 57 at notch 4, at notch 3, at notch 2 and at notch 1. The specific injection timings and HCCI pilot fractions can be altered to achieve an overall optimum combustion strategy.

In operation, the combustion strategy of the engine 20 increases the standard compression ratio by prolonging compression and retarding introduction of fuel in order to recover fuel consumption. The strategy also monitors the manifold air temperature of the engine for the most effective $NO_x$ control. Such a combustion strategy addresses control of emission at the source of emission itself. Moreover, for emission reduction at the exhaust end, the exhaust from the engine 20 is treated by oxidizing catalysts 59. The oxidizing catalysts 59 are deposited as a layer of coating on the inner lining of the exhaust manifold 24 of the engine 20 and these oxidize the HC and CO compounds present in the exhaust from the engine 20 into less polluting compounds such as carbon dioxide and water.

The combustion strategy for the two-stroke engine 20, as illustrated in FIG. 3 is typically associated with an emission level as illustrated in FIG. 5. For the purposes of describing one embodiment of the present invention, it is assumed that the emission level of the eight notch engine 20 is determined as a function of the compared values of the desired and actual power levels during each cycle of the engine. For example, during the first notch, the expected emission level of $NO_x$ is 2.16 g/hp/hr as compared to a Tier-0 emission level of 21.61 g/hp/hr. Similarly, the pairs of expected and actual Tier-0 emission levels for notches 2, 3, 4, 5, 6, 7, and 8 are respectively 1.06, 10.59; 0.92, 9.17; 0.88, 8.84; 1.66, 8.3; 3.42, 8.56; 6.68, 8.15; 6.00, 9.11 in g/hp/hr. This combustion strategy brings the expected duty cycle emission level below the EPA Tier-2 emission level.

Figure 6:
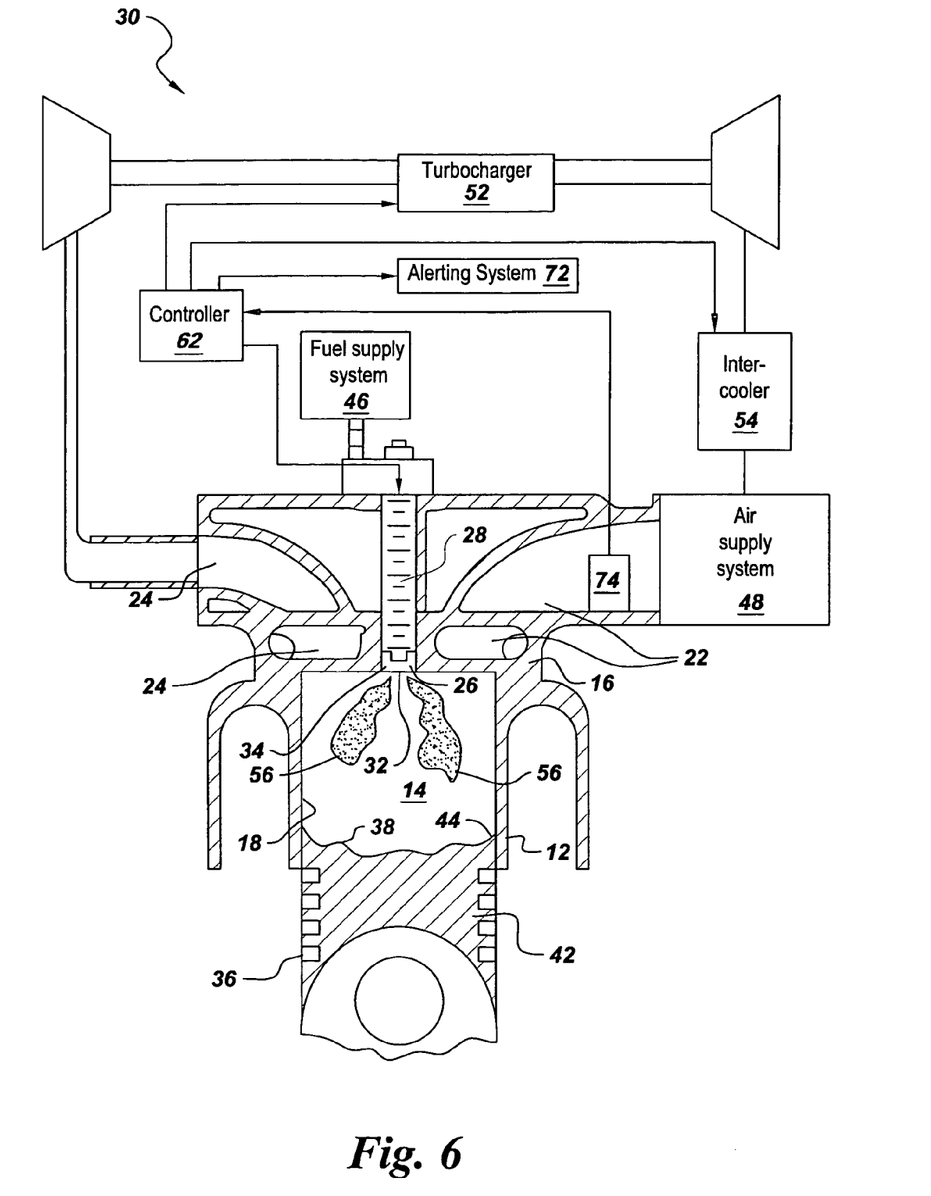
FIG. 6 is a simplified cross-sectional view of a four-stroke direct injection compression ignition engine system in accordance with an exemplary embodiment of the invention.
Figure 7:
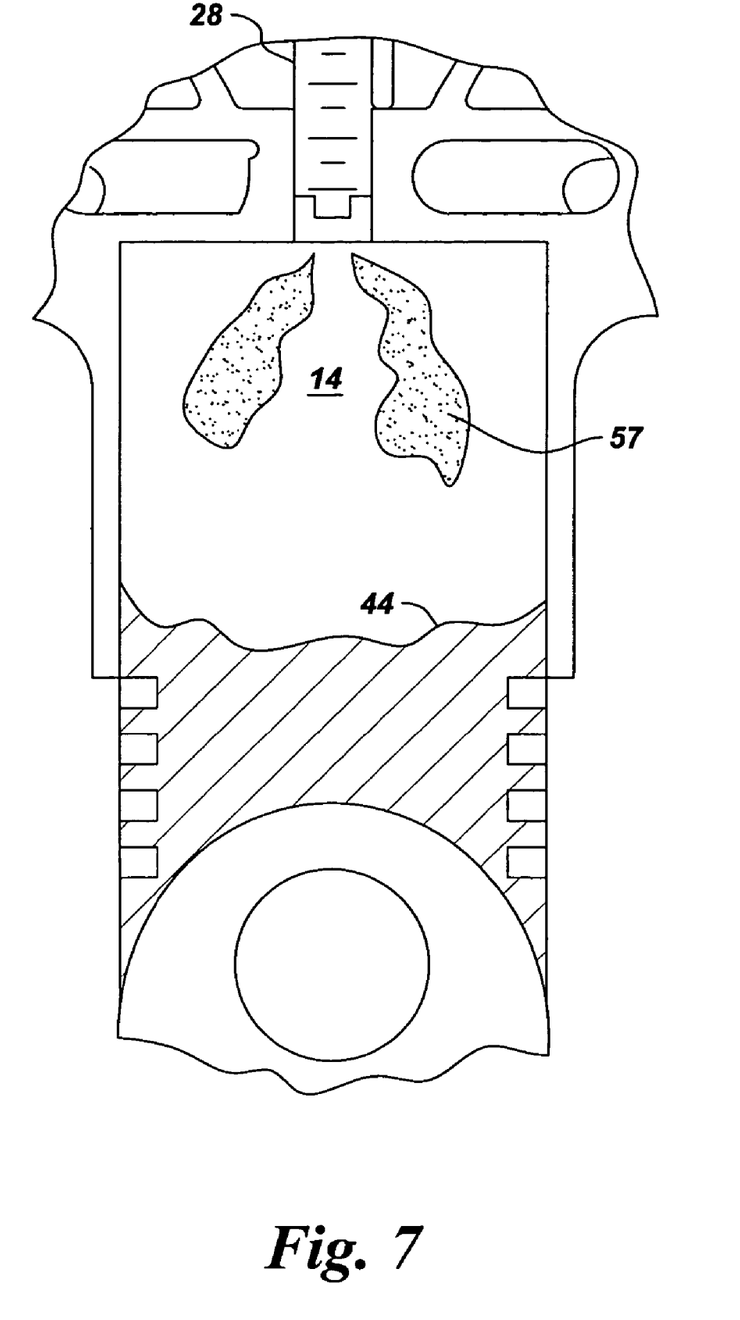
FIG. 7 is a simplified cross-sectional view of the combustion cylinder of a four-stroke direct injection compression ignition engine system at an instant of injection of a main charge in accordance with an exemplary embodiment of the invention.

An alternative to the embodiment in FIG. 2 is illustrated in FIG. 6. In particular, FIG. 6 shows a four-stroke cycle, medium speed diesel engine 30 with in-cylinder premixing. The engine 30 uses an alerting system 72 that includes a manifold air temperature sensor 74 to alert the operator of conditions that may result in higher than desired emissions. Other than the alerting system 72 and the manifold air temperature sensor 74, the engine 30 is substantially similar to engine 20 shown in FIG. 2. The components in engine 30 that are similar in functionality to components of engine 20 are referred to using the same reference numerals used in FIG. 2 and FIG. 3. FIG. 7 is a simplified cross-sectional view of the combustion cylinder 14 of the engine 30 and it illustrates an instant of injection of main charge 57 through nozzle 32 into cylinder 14.

In engine 30, the inlet air is compressed, as is known in the art, using the turbocharger 52 and then cooled by the intercooler 54. The inlet air then passes through the air intake manifold 22 prior to being drawn into cylinder 14. The present invention recognizes that the combustion efficiency of an engine and the level of exhaust emissions from the engine are influenced by the temperature of air in the air intake manifold 22. As will be appreciated by those skilled in the art, one can analytically, empirically or experimentally determine a respective functional relation or model between intake manifold air temperature and the emission level of the engine 30.

The method of emission control as exemplified in this embodiment of the present invention allows for sensing a desired power level and for selectively adjusting the manifold air temperature of the air intake manifold 22 based on the desired power level of the engine 30. The manifold air temperature sensor 74 continuously senses the temperature of the air in the air intake manifold 22. The sensor 74 sends the sensed value of the manifold air temperature to the controller 62 and the controller 62 compares this value with a reference temperature. The reference temperature is a predetermined limit of temperature known to be safe for operation of the engine 30 from a point of view of keeping the emission level below an acceptable limit. If the air temperature of the air intake manifold 22 exceeds the predetermined reference temperature, engine controller 62 issues an alert signal to the alerting system 72. At the same time, the engine controller 62 issues another alert signal to an operator as a warning message to check the cooling system (not shown) of the engine.

The combustion strategy adopted in this embodiment of the invention reduces the emission of $NO_x$. However, one of the strategies of $NO_x$ reduction—retarding injection timing of fuel, causes a corresponding increase in particulate emissions, particularly of the dry carbon or soot portion. There are other strategies to reduce the emissions of non-$NO_x$ gases. One such strategy to reduce the level of the emission, specifically of HC compounds in the exhaust from the engine 30 is to design the injector needle sac for better control of emission, specifically of the HC compounds.

Figure 8:
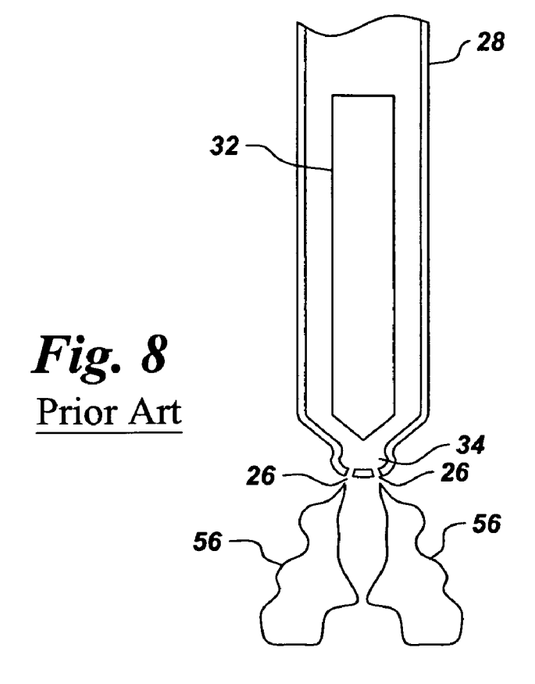
FIG. 8 is a simplified cross-sectional view of a nozzle, an injector and a needle sac used in an engine as found in prior art.

FIG. 8 is a simplified cross-sectional view of a nozzle, an injector and a needle sac as found in prior art. The fuel injector nozzle 28 houses a spring-loaded injection needle 32, which in a normal position is pressed down by a spring from above (not shown) closing the mouth of the sac 34. In such a closed condition, there is no flow of fuel into the sac 34 and from the sac 34 into the combustion cylinder 14 through the fuel injection ports 26. Subsequently, at the time of fuel injection, a predetermined quantity of fuel is sent down the injector nozzle 28. As a result, the pressure of the fuel accumulating in the fuel cavity of the injector builds up and pushes the injector needle 32 up, overcoming the force of the spring. At that instant, a controlled volume of fuel enters into the sac 34 first and then into the combustion cylinder 14 through the fuel injection ports 26. However, all the fuel entering into the sac 34 during one injection cycle does not get emptied into the combustion cylinder 14. Some residual fuel is left back in the sac 34. The fuel left in the sac drips into the combustion cylinder 14 through the fuel injection ports 26. These residual fuel droplets from the sac 34 are not atomized properly and as a result do not burn completely in the combustion cylinder 14. Incomplete combustion of the residual fuel droplets gives rise to high emission levels.

Figure 9:
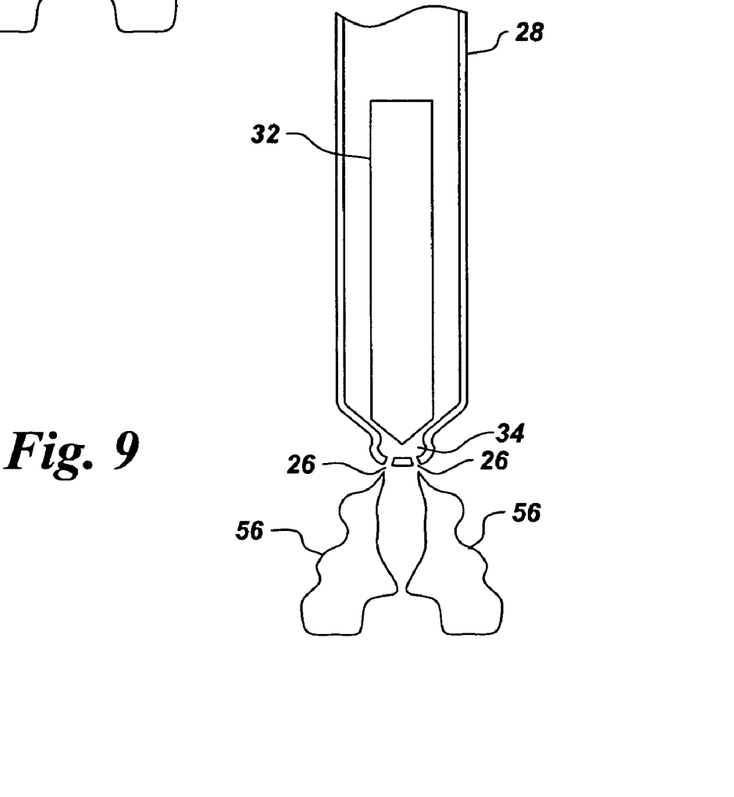
FIG. 9 is a simplified cross-sectional view of a nozzle, an injector and a needle sac in accordance with an exemplary embodiment of the invention.

FIG. 9 illustrates the design of an improved injector needle sac according to an embodiment of the invention. In particular, the volume of the injector needle sac as shown in FIG. 9 is minimized. This design ensures that very little amount of residual fuel is trapped in the sac 34.

The combustion strategy for the four-stroke compression ignition engine 30 as described above is shown in FIG. 10. Each number in the column 'NOTCH' represents a power level of the engine. In operation, premixed charge is formed at notches 2, 3 and 4 via injecting the fuel early in the cycle at injection timings ranging from 180 crank angle degree (CAD) before top dead center (BTDC) to −0 CAD BTDC for the four-stroke engine. Notch 5 uses up to 80% of the fuel in early injection and the remaining portion of fuel is injected at a timing ranging from 10 CAD BTDC to 10 CAD after top dead center (ATDC). Notch 6 uses up to 60% of the fuel in early injection and the remaining portion is injected as main fuel. Timing is retarded at notches 7 and 8 to 1 CAD ATDC and 1.5 CAD BTDC respectively. Advanced turbo machinery, such as Turbocharger 52 is used to provide additional air from 'idle' notch to notch 5 for particulate and smoke control. Injection timing of the pilot charge 56 is varied between 180 CAD BTDC to −0 CAD BTDC with the main injection varied between 10 CAD BTDC to 10 ATDC up to notch 6. Timing is retarded at notches 7 and 8. In summary, the combustion strategy includes retarded main injection at notch 8; retarded main injection at notch 7, 60% HCCI pilot charge 56 and 40% main charge 57 at notch 6; 80% HCCI pilot charge 56 and 20% main charge 57 at notch 5; 100% HCCI pilot charge 56 and no main charge 57 at notch 4, at notch 3, at notch 2 and at notch 1.

Figure 10:
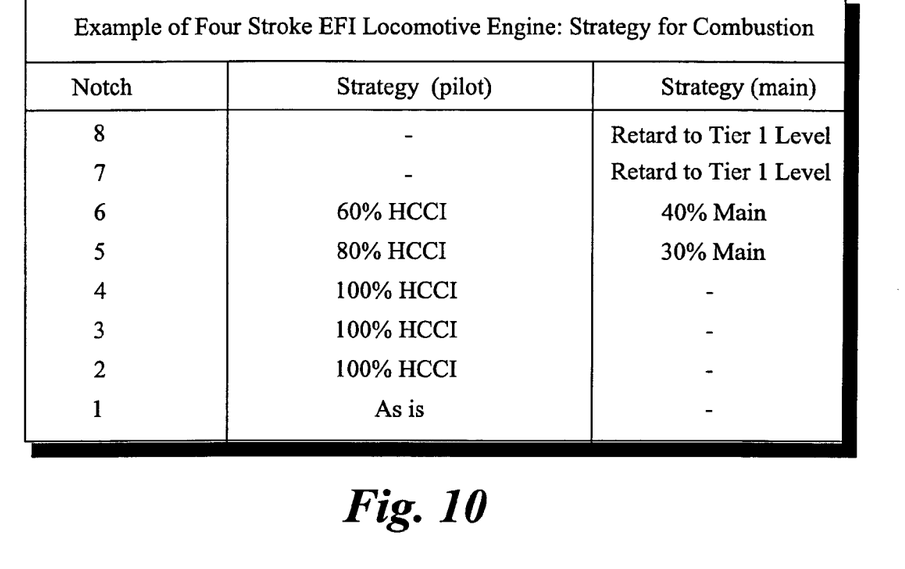
FIG. 10 is a combustion strategy of a four-stroke compression ignition engine in accordance with an exemplary embodiment of the invention.

In operation, the combustion strategy as illustrated in FIG. 10 addresses control of emission from the engine 30 at the source. In addition, to reduce emission at the exhaust end, the exhaust from the engine 30 is treated by oxidizing catalysts 59 as illustrated earlier in relation to engine 20.

Figure 11:
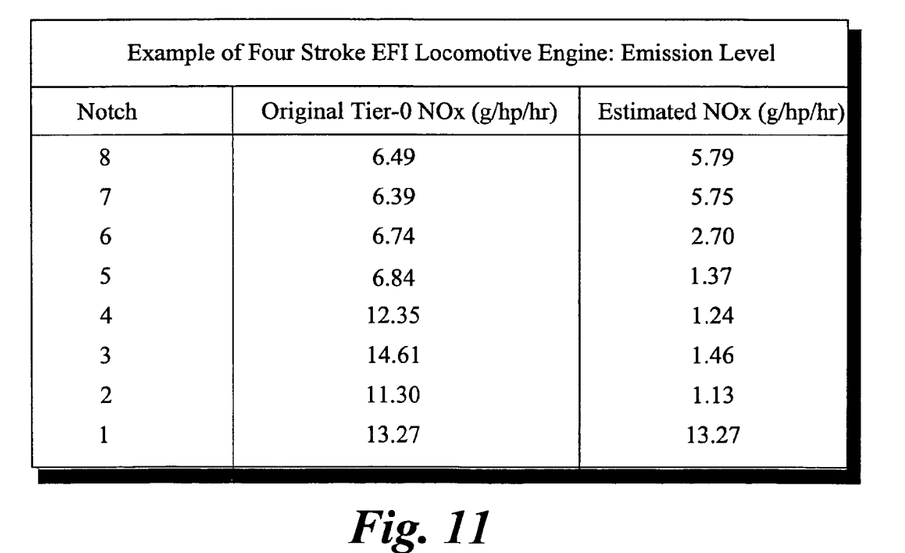
FIG. 11 is an emission level of a four-stroke compression ignition engine in accordance with an exemplary embodiment of the invention.

The combustion strategy for the four-stroke engine 30, as illustrated in FIG. 10 is typically associated with an emission level as illustrated in FIG. 11. For the purpose of describing this embodiment of the invention, it is be assumed that the emission level at a given notch of the typical eight-notch engine 30 is determined as a function of compared values of the desired and actual power levels of the engine. For example, during the first notch, the expected emission level of $NO_x$ is 13.27 g/hp/hr as compared to a Tier-0 emission level of 13.27 g/hp/hr. Similarly, the pairs of expected and actual Tier-0 emission levels for notch 2, 3, 4, 5, 6, 7, and 8 are respectively 1.13, 11.30; 1.46, 14.61; 1.24, 12.35; 1.37, 6.84; 2.70, 6.74; 5.75, 6.39; 5.79, 6.49 in g/hp/hr. This combustion strategy brings the expected duty cycle emission level below the Tier-2 emission.

Figure 12:
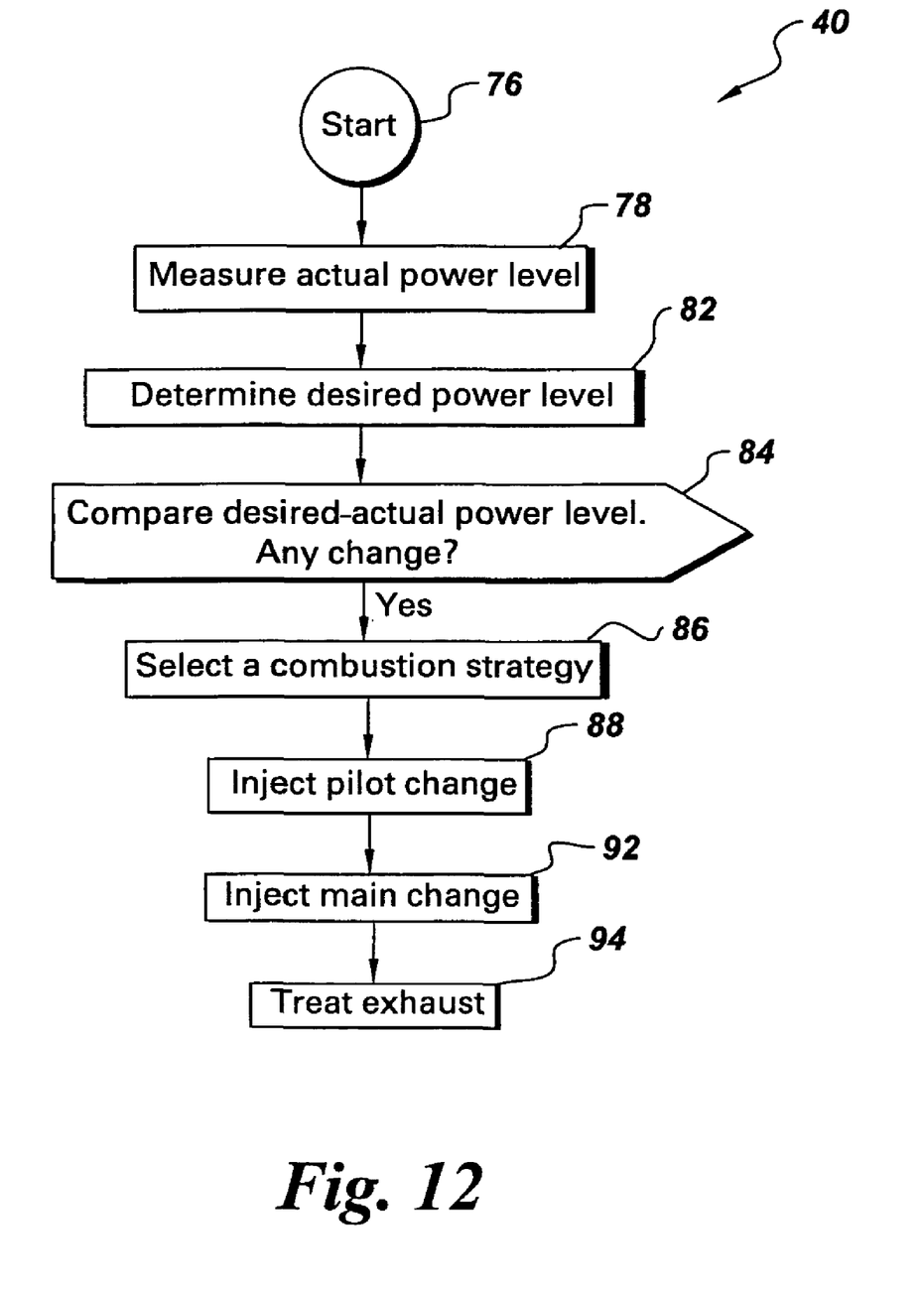
FIG. 12 is a flow chart representing an algorithm that performs emission control of a compression ignition locomotive engine according to one embodiment of the invention.

In operation, the overall functioning of the engine system 20 or 30 is explained in FIG. 12. FIG. 12 is a flow chart representing an algorithm that is used to perform a method of emission control 40 of a compression ignition locomotive engine as described in the present invention. A suitable combustion strategy is selected and implemented through a number of steps. This implementation includes storing of a particular combustion strategy in a particular variable within a microprocessor. The desired combustion strategies are selected based on the 'NOTCH' columns of FIG. 4, 5, or 10, 11 or any other group of numerical values in which each numerical value is associated with a particular power level of the engine.

Depending on the notch setting of the engine, a combustion strategy is selected. Referring to FIG. 12, the method of emission control 40 starts as in functional block 76 and the actual power level of the engine is measured as in functional block 78. Next, the dynamic control method of the invention adjusts the combustion strategy to accomplish the desired emission level at functional block 82. Proceeding forward, depending upon the combustion strategy selected in block 86, a pilot charge 56 may be injected at functional block 88 followed by an injection of a main charge 57 at functional block 92 to achieve the power level of the notch setting. Finally, if further hydrocarbon emissions reduction is required the exhaust from the engine passes over the oxidation catalyst 59 for HC emission removal at functional block 94.

Thus, in essence, the present invention provides a dynamic control method for controlling the emission levels at different desired power levels of an engine by varying the combustion strategies with the desired power levels. Software routines stored in the engine controller of the engine capture the functional relationship between desired power levels and the combustion strategies corresponding to them. It should be understood that such combustion strategies are implemented by supplying the appropriate A/F ratio at the right timing to achieve the desired emission level.

The invention is not limited to the above-described configuration of the compression ignition diesel engines. In other embodiments of the invention, different configurations of the direct injection diesel engines may be considered. For instance, a two-stroke direct injection diesel engine with multiple cylinders, or an engine with fewer than or greater than eight notch levels, or a continuous power curve. Similarly, in other embodiments of the invention, the target emission level is anything other than US EPA Tier-2. For instance, US EPA Tier-1 emission level or something similar is used as the target emission level.

Exemplary embodiments of diesel engine fuel injection systems are described above in detail. The systems are not limited to the specific embodiments described herein, but rather, components of each system may be utilized independently and separately from other components described herein. Each diesel engine fuel injection systems component can also be used in combination with other diesel engine fuel injection systems components.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method for controlling an emission level of a compression ignition engine equipped with an electronic fuel injection system, comprising:
    measuring an actual power level of the engine;
    comparing a desired power level with said actual power level of the engine;
    implementing a combustion strategy based on the comparing of said desired and actual power levels; and
    implementing an emission strategy based on said combustion strategy, wherein said emission strategy is intended to attain a predetermined emission level in exhaust from the engine.

2. The method according to claim 1, wherein the implementing of a combustion strategy comprises:
    injecting a pilot charge into a combustion cylinder of the engine;
    forming a premixed charge from said pilot charge;
    injecting a main charge into the combustion cylinder of the engine, wherein said main charge may initiate combustion of said premixed charge formed by said pilot charge; and
    monitoring a predetermined attribute in relation to combustion of said homogeneous charge and said main charge.

3. The method according to claim 2, wherein said a premixed charge comprises mixing a charge of a combustion fuel and air in a predetermined proportion.

4. The method according to claim 3, wherein said mixing comprises mixing the fuel and air homogeneously.

5. The method according to claim 3, wherein said mixing comprises mixing the fuel and air in a predetermined stratification.

6. The method according to claim 2, wherein said predetermined attribute is a crank angle position at an instant of an injection of said pilot charge or said main charge into the combustion cylinder of the engine.

7. The method according to claim 2, wherein said predetermined attribute is a retard time in relation to an instant of beginning of an injection of a main charge into the combustion cylinder of the engine.

8. The method according to claim 2, wherein implementing said combustion strategy further comprises implementing a combustion strategy for a two-stroke engine.

9. The method according to claim 8, wherein implementing said combustion strategy further comprises implementing a combustion strategy for increasing a compression ratio.

10. The method according to claim 8, wherein implementing said combustion strategy further comprises implementing a combustion strategy for reducing manifold air temperature in the engine.

11. The method according to claim 8, further comprising designing a ring pack for reducing consumption of lubricating oil used in the combustion cylinder of the engine.

12. The method according to claim 2, wherein implementing said combustion strategy further comprises implementing a combustion strategy for a four-stroke engine.

13. The method according to claim 12, further comprising designing an injector needle sac for the engine, wherein volume of the injector needle sac is a minimum.

14. The method according to claim 12, further comprising monitoring degradation of manifold air temperature in the engine in relation to a predetermined reference temperature.

15. The method according to claim 14, further comprising changing a quantity of said pilot charge when said manifold air temperature exceeds said predetermined reference temperature.

16. The method according to claim 14, further comprising issuing an alert when said manifold air temperature exceeds said predetermined reference temperature.

17. The method according to claim 16, wherein issuing an alert comprises issuing a warning to check a cooling system of the engine.

18. The method according to claim 1, further comprising treating the exhaust from the engine.

19. The method according to claim 18, wherein said treating comprises oxidizing an undesired compound present in the exhaust from the engine.

20. The method according to claim 19, wherein said oxidizing comprises oxidizing a hydrocarbon compound present in the exhaust from the engine.

21. The method according to claim 19, wherein said oxidizing comprises oxidizing a carbon monoxide compound present in the exhaust from the engine.

22. The method according to claim 1, wherein said predetermined emission level is a Tier-2 emission level for locomotive engines.

* * * * *